US005877852A

United States Patent [19]

Schilbach et al.

[11] Patent Number: 5,877,852

[45] Date of Patent: Mar. 2, 1999

[54] CASH-BOARD

[75] Inventors: Peter Schilbach, Buxtehude; Britta Stolle, Hamburg, both of Germany

[73] Assignee: MGC Manfred Gaus Creative Medien Marketing GmbH, Hamburg, Germany

[21] Appl. No.: 40,147

[22] Filed: Mar. 17, 1998

Related U.S. Application Data

[63] Continuation of Ser. No. 712,129, Sep. 11, 1996, abandoned.

[30] Foreign Application Priority Data

Sep. 14, 1995 [DE] Germany ........................ 195 34 101.5

[51] Int. Cl.$^{6}$ .............................. G06K 9/74; F21V 33/00

[52] U.S. Cl. .............................................. 356/71; 362/234

[58] Field of Search .............................. 356/71; 362/125, 362/154, 268, 331, 375, 99, 98, 97, 234, 253, 103, 31, 260; 283/85; 250/329

[56] References Cited

U.S. PATENT DOCUMENTS

| | | | |
|---|---|---|---|
| 5,041,954 | 8/1991 | Forrest, Jr. | 362/234 |
| 5,287,254 | 2/1994 | Solman | 362/98 |
| 5,499,165 | 3/1996 | Holmes, Jr. | 362/31 |
| 5,676,444 | 10/1997 | Liao | 362/31 |

*Primary Examiner*—Hoa Q. Pham
*Assistant Examiner*—Michael P. Statira
*Attorney, Agent, or Firm*—Howson and Howson

[57] ABSTRACT

The invention concerned is a money tray with casing whose lid contains an illuminated area, illuminable by at least one light medium which is located within the casing, and which has at one end of the casing a testing device for banknotes and/or credit cards. This design firstly offers the advantage of eye-catching advertising. At the same time it is possible to test the banknotes placed on it for their authenticity. The light sources required for this can have a shared electricity supply, so that only one electric cable is necessary and space on the counter is not unnecessarily restricted.

18 Claims, 2 Drawing Sheets

CASH-BOARD

This is a continuation of abandoned U.S. patent application Ser. No. 08/712,129 filed Sept. 11, 1996.

BACKGROUND OF THE INVENTION

The invention concerns a money tray for shop counters and suchlike.

Conventional money trays made of acrylic or plastic usually have the required change dish and frequently have an advertisement printed on the surface. In this case the advertisement has only a limited effect because illumination is lacking. In addition the advertisement wears off in time through frequent handling. Furthermore it is a disadvantage that the advertisement is printed permanently on the money tray, meaning that it is not always up-to-date because the product is no longer sold or its presentation has been changed.

Another problem is that the use of forged banknotes is increasing. There are banknote testing devices in existence which are placed near the cash till and use ultraviolet light to distinguish between genuine and forged banknotes. However, in order to use these testing devices adequate space is required near the cash till to install them. Moreover, customers may find it unpleasant to have their banknotes checked in such an obvious manner with a movement of the hand towards the testing device.

SUMMARY OF THE INVENTION

The invention is based on the need for a new type of money tray which allows eye-catching advertising together with less obvious testing of banknotes.

The problem is solved by the invention in the form of a money tray whose casing has a lid with an illuminable cover plate, which is lit up by at least one illumination means located within the casing and which includes a testing device for banknotes and/or credit cards at one edge. This design offers the advantage of eye-catching advertising. At the same time it is possible to check the authenticity of banknotes. The testing device and the means of illumination can share one source of electricity so that only one electric cable is required, which will not restrict space on the counter unnecessarily.

The testing device for banknotes and/or credit cards may for example use ultraviolet light which allows testing of many banknotes of various currencies. For US dollar bills a different testing device is required with a reading head which is run over the surface of the banknote. However, these testing devices are well-known and do not require further explanation.

In one form of the invention it is intended to at least partially cover the banknote testing device, and especially the UV-light source, from above by the lid of the casing. This has the advantage that any effects from other sources of light are avoided. Furthermore the UV-light is then concealed and testing of banknotes can be carried out discreetly when removing them from the money tray. The customer concerned or indeed any others will generally not notice this taking place.

Another model is designed to have a covering plate made of glass or plastic, behind which at least one slide can be accommodated. This has the advantage that the advertisement in the form of a slide can be easily changed and ensures that the advertisement on the money tray is always up-to-date. The cover plate can be fixed to the lid of the casing but detachable to enable changing of the slide.

Shock-proof, scratch-resistant material is particularly suitable for the cover plate. This has the advantage that even after prolonged use, the scratching effect of coins landing on the surface is minimized so that the advertisement presented remains visually appealing.

A preferred form of the invention has an optical light-guiding or light-scattering plate which can be illuminated by the light medium and is located parallel to and below the cover plate, so that at least one slide can be inserted between the light-guiding or light-scattering plate and the cover plate. This has the advantage that the money tray is shallow in height and will not cause undue hindrance on the counter.

It may be practical to illuminate the light-guiding plate at the points of light entry, e.g. the front edges, by two fluorescent tubes located at opposite ends of the light-guiding plate, with screening means in place to restrict the flood of light to illumination of the points of light entry.

In the case of a light-scattering plate, this may for example be in the form of a diffuser made of a white milky, light-diffusing material such as acrylic. If using a white acrylic plate it is advisable to illuminate this mainly from below. The light can be used more effectively if the surface facing the light-scattering plate is made of reflective material. With this an even and bright illumination of the cover plate by the light-scattering plate can be effected.

A change dish in the lid of the casing is advisable in all cases. This helps to prevent coins from falling off and also encourages customers to place coins in the dish rather than on the illuminated billboard.

It may also be practical to have the base of the casing at least partially open and to incorporate a cooling element within the casing to dispel the heat generated by the light source. This prevents a build-up of heat and the resulting failure of the electrical system or the lighting. Air vents may also be provided as an alternative or in addition to the cooling element.

A further form of the invention is designed to operate the light medium and/or the banknote testing device on low voltage electricity. This has the advantage that the mains transformer generally used for small light sources may also be located outside the casing. Here the space required and the accumulation of heat within the casing is reduced further and the casing can be made relatively flat.

Another model is designed to have the lid of the casing as a hood, formed as a single piece with the end opposite the banknote testing device and the side panels and being detachable from the base. This has the advantage that the top of the money tray, i.e. the user surface, has no joins or cracks which could accumulate dirt or be a hindrance when picking up money. Removable connections such as screws allow the lid to be detached from the base without special tools, for example to replace defective lighting. Furthermore the light-guiding or light-scattering plate is exposed when the lid is removed, enabling the slide to be changed easily.

Another preferred design has a slit-like opening on one of the narrow sides, running parallel to and below the illuminable cover plate and above the light-guiding or light-scattering plate, so that a slide may be removed and inserted without opening the casing.

BRIEF DESCRIPTION OF THE DRAWINGS

The invention is depicted more clearly in the following drawings in which.

DESCRIPTION OF THE PREFERRED EMBODIMENTS

Figure 1:
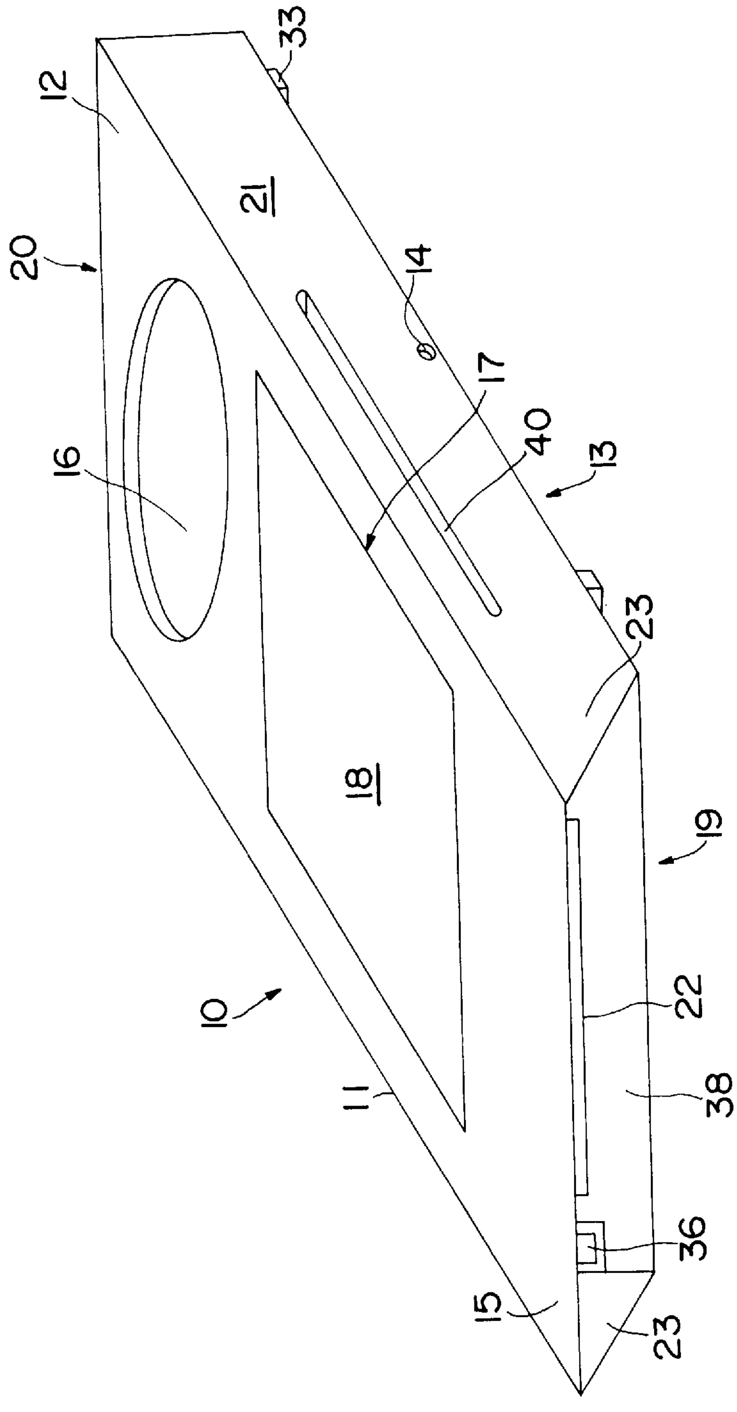
FIG. 1 is a perspective view of the money tray according to the invention
Figure 2:
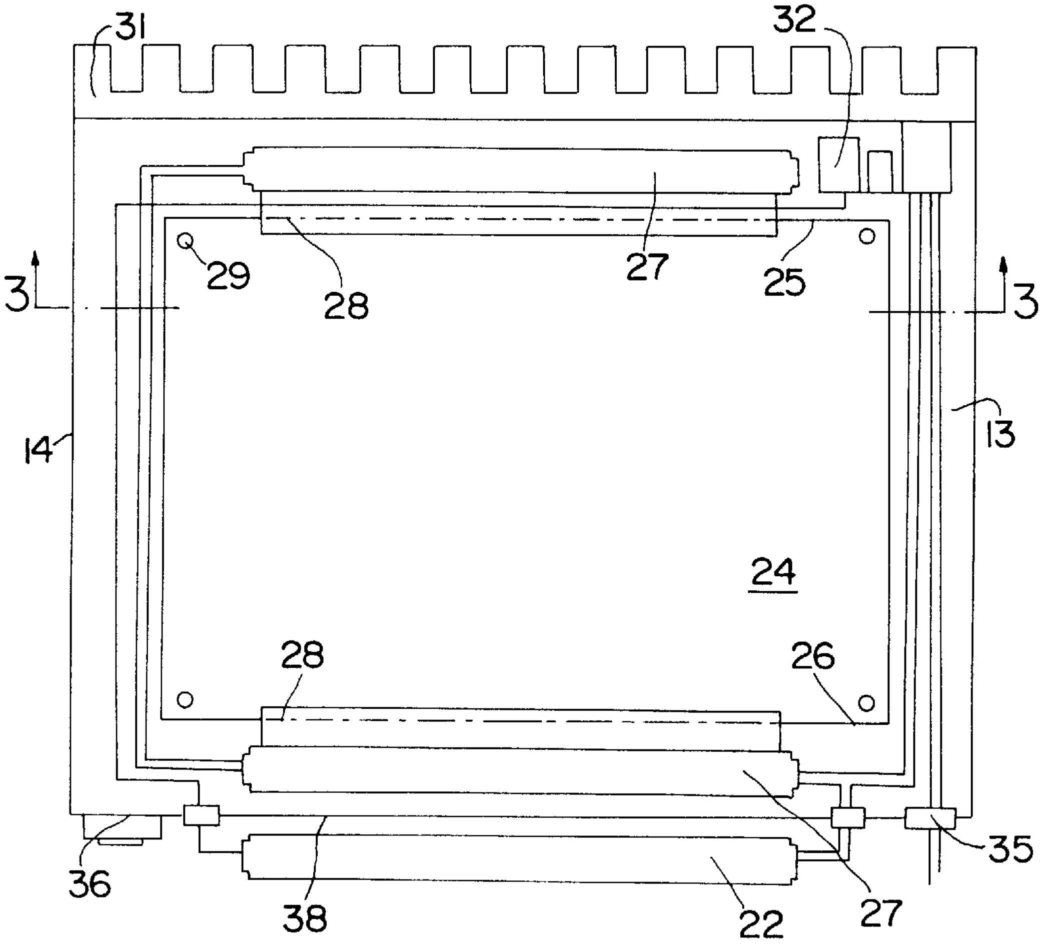
FIG. 2 is a top view of the money tray with the lid removed.
Figure 3:
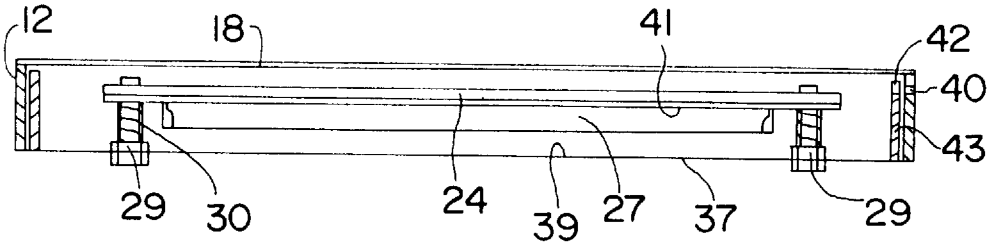
FIG. 3 is a sectional view along the line A—A in FIG. 2.

The money tray 10 comprises a flat, basically cuboid casing 11 with a lid 12 and a base 13. The lid of the casing 12 is detachable from the base, being joined by connecting pieces 14, not shown in detail here. These connecting pieces may for example be screws and be located in the middle of a side panel 21. In principle the casing may also be a different shape, for example a round disc.

On the top of the lid 12 there is a change dish intended for coins. With a metal lid the change dish can be deepdrawn. If the lid is made of plastic the dish can be formed.

Furthermore there is a recess 17 in the lid 12 in which an illuminable cover plate 18 is set. The cover plate 18 may be a plate of high-strength glass or plastic and translucent, preferably transparent. In individual models the covering plate 18 may be fixed to the lid or detachable. However it could also be designed with the cover plate 18 fixed to the base 13, so that when the lid is closed this is more or less level with the cover plate.

It may be practical if the cover plate 18 is made of plastic and surrounded by a shoulder which allows the top of the cover plate to close flush with the top of the lid. The illuminable cover plate 8 may be stuck via the shoulder to the underside of the lid.

Furthermore a section 15 of the surface of the lid 13 extends over one end of the casing 11 to form a recess 19.

In the design shown in the drawing the lid is joined to the end 20 opposite the recess 19 and the side panels 21 to form a single piece like a hood. At the point of the recess, the side panels 21 each extend to form a beveled section 23.

In the recess 19 is a testing device for banknotes, credit cards etc., for example a tubular UV-light source 22, which is fixed to a suitable vertical wall section 38 of the base 13. The UV-lamp is for checking banknotes. In principle it is possible to position the UV-light source elsewhere. However, locating the banknote testing device at one end of the casing brings with it the advantage that the banknote is automatically passed over the device when being removed, meaning the check can be carried out discreetly.

Below the cover plate 18 where the recess 17 is located on the lid, there is on the base 13 a light-scattering plate 24, which is joined to the base 13 by spacer blocks 30 and/or screws 29. In individual models the screws may be joined to the floor of the base 37 by locknuts which fit into corresponding holes in the four corners of the light scattering plate 24. The spacer blocks 30 are set between the light-scattering plate 24 and the floor of the base 37, allowing fixed positioning of the light-scattering plate in relation to the casing.

In the example shown the light-scattering plate 24 is made of white, light-diffusing acrylic and is illuminated by two fluorescent tubes at the two opposite edges 25, 26 which run parallel to the end 20 of the casing. The fluorescent tubes 27 are positioned to illuminate the acrylic plate mainly from below. To make better use of the light, reflective screens 28, of aluminum for example, may be incorporated to avoid deflection of the light in other directions. Furthermore the floor of the base 37 which faces the light-scattering plate may be fitted with a reflective surface 39 in order to increase the flood of light towards the underside 41 of the acrylic plate. Through the acrylic plate or other optical diffusing medium the light is distributed evenly to illuminate the cover plate 18 from below.

For advertising purposes a slide (not shown) may be placed on the light-scattering plate. The light-scattering plate may hold the slide tightly in place between itself and the cover plate. Alternatively an interplate (also not shown) may be placed between the slide and the light-scattering plate. It may also be designed that the length of the screws are such that when the lid is in place the light-scattering plate is held by slight prestress beneath the cover plate, so that the slide is securely held.

In the version shown in the drawing, the lid 12 has on at least one narrow side 21 a slit-like opening 40 which corresponds to a recess 42 in the side panel 43 of the base 13. This design is such that the slit 40 runs parallel to and below the cover plate 18 and above the light-scattering plate 24, so that a slide can be sandwiched between the light-scattering plate and the cover plate 18 when the money tray is fitted together and the lid closed. In this case operation is considerably easier. The gap between the cover plate and the light-scattering plate is calculated so that the slide can be easily inserted but at the same time securely held. Furthermore guiding elements may be included to facilitate straight insertion and ensure that the slide is securely positioned.

As already mentioned, the cover plate 18 on the light-scattering plate may be joined to the base 13, whereby the cover plate fits into the recess 17 when the lid is in place. However, if the lid is made of sufficiently thin material such as metal, the outside edge of the cover plate may still push against the bottom of the lid.

On the side 38 opposite the UV-light source 22 of the base 13 is a cooling element which runs along the entire width of the casing in order to protect the electrical system 32, the lighting and the inside of the casing from overheating. It may be sufficient to put air vents on this side 38. Furthermore the base is partially open, particularly where the cooling element is located, to ensure adequate ventilation and heat diffusion. In addition the bottom of the base 13 may be fitted with feet to create a gap between the money tray and the counter. Air vents may also be put at the sides. The lid may be extended over the base where the cooling element and the vents are located to form a hood, which for example would present a smooth surface to the customer rather than sides with openings.

The electrical system 32 is run on low-voltage electricity, e.g. 12 volts. Furthermore there is an on/off switch which can be connected to allow separate operation of the billboard 18 illumination and the banknote testing device.

It is clear that a variety of problems can be solved with a money tray of this nature. Firstly the money tray provides an ideal opportunity for advertising. By having an exchangeable slide in the illuminated billboard, the advertisement is always up-to-date. Secondly with the hidden banknote testing device, for example a concealed UV-lamp, it is possible to check the authenticity of banknotes quickly and discreetly. Finally the money tray requires not more space than a conventional money tray, despite these numerous possibilies.

We claim:

1. A money tray comprising:

a casing having a lid with an illuminable cover plate;

at least one illumination means located within said casing for illuminating said cover plate; and a testing device located at one edge of said casing for testing banknotes.

2. A money tray according to claim 1, wherein said testing device has a UV-light source.

3. A money tray according to claim 2, wherein said UV-light source is at least partially covered from above by said lid.

4. A money tray according to claim 1, wherein said testing device has a reading head for testing a US dollar bill.

5. A money tray according to claim 1, wherein said cover plate is made of glass; and further comprising at least one slide adapted to be accommodated behind said cover plate.

6. A money tray according to claim 1, wherein said cover plate is made of plastic; and further comprising at least one slide adapted to be accommodated behind said cover plate.

7. A money tray according to claim 6, wherein said cover plate is scratch-resistant and shock-proof.

8. A money tray according to claim 1, further comprising an optical light-scattering plate positioned in said casing below and parallel to said cover plate, said optical light-scattering cover plate being illuminated by said illumination means; and further comprising at least one slide positionable between said optical light-scattering plate and said cover plate.

9. A money tray according to claim 8, wherein said illumination means includes a pair of fluorescent tubes located on opposite edges of said light-scattering plate.

10. A money tray according to claim 8, wherein said pair of fluorescent tubes emits a flood of light; and further comprising at least one screen for restricting said flood of light.

11. A money tray according to claim 8, wherein said light scattering plate is made of white, light diffusing plastic.

12. A money tray according to claim 8, wherein said illumination means illuminates said light-scattering plate from below said light-scattering plate.

13. A money tray according to claim 12, wherein said casing has a base, and further comprising a reflective layer located on at least a part of said base, said reflective layer positioned to face said light-scattering plate.

14. A money tray according to claim 1, wherein said casing has a change dish formed in said lid.

15. A money tray according to claim 8, wherein said casing has a side panel with a slit-like opening, said opening extends parallel to and below said cover plate and above said light-scattering plate such that said slide is capable of being inserted through said opening and between said light-scattering plate and said cover plate.

16. A money tray according to claim 1, wherein said illumination means and said testing device are capable of being operated on low-voltage electricity.

17. A money tray comprising:

a casing having a lid with an illuminable cover plate;

at least one illumination means located within said casing for illuminating said cover plate; and a testing device located at one edge of said casing for testing credit cards.

18. A money tray according to claim 17, wherein said testing device can also test banknotes.

* * * * *